UNITED STATES PATENT OFFICE 2,464,171

DERIVATIVES OF 9-ANILINOACRIDINE

Edgar C. Britton and Gerald H. Coleman, Midland, Mich., assignors to The Dow Chemical Company, Midland, Mich., a corporation of Delaware No Drawing. Application August 29, 1945, Serial No. 613,443

7 Claims. (Cl. 260—279)

This invention relates to new organic compounds which are derivatives of 9-anilinoacridine and to a method of making them.

The new compounds of the invention correspond to the general formula:

(I)
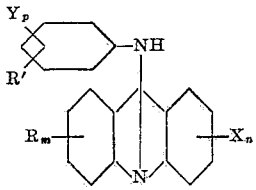

in which R is lower alkoxy, R' is mononuclear aryl or aryloxy, X and Y each is halogen, and $m$, $n$, and $p$ each is an integer from 0 to 2. These compounds are in general yellow crystalline solids useful in the manufacture of dyestuffs and pharmaceuticals.

Within this group of new compounds, the 2-alkoxy-6-haloacridine derivatives corresponding to the general formula:

(II)
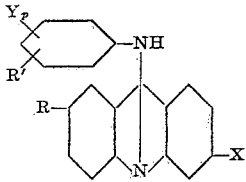

wherein R is lower alkoxy, R' is mononuclear aryl or aryloxy, X and Y each is halogen, and $p$ is an integer from 0 to 2, are of greatest interest, in that they are showing initial promise as parasiticides and bactericides.

The new products are conveniently prepared in good yield by causing a 9-chloroacridine derivative corresponding to the general formula:

(III)
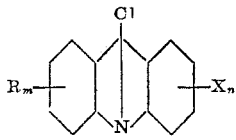

wherein R is lower alkoxy, X is halogen, and $m$ and $n$ each is an integer from 0 to 2, to react with an aniline derivative corresponding to the general formula:

(IV)
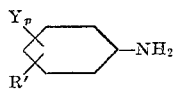

wherein R' is mononuclear aryl or aryloxy, Y is halogen, and $p$ is an integer from 0 to 2. The reaction is preferably carried out by introducing the reactants in roughly equimolecular proportions into an excess of a mutual solvent, suitably molten phenol, and heating the solution with stirring until reaction is complete, usually in a very few hours. The resulting mixture is then treated with excess aqueous alkali to liberate the desired basic reaction product as a precipitate, which is then removed by filtration, washed with water, and preferably also with hot alcohol. The product may be further purified, if desired, by recrystallization from a volatile solvent. Alternatively, the free base may be converted to the hydrochloride by treatment with hydrochloric acid, and the hydrochloride purified as desired.

Among the 9-chloroacridine compounds corresponding to the formula III, above, which are useful as reactants in making the compounds of the invention are: 9-chloroacridine, 6,9-dichloroacridine, 2,6,9 - trichloroacridine, 9 - chloro-2-methoxyacridine, 9-chloro-2-ethoxyacridine, 2-bromo - 9 - chloro-6-methxyacridine, 9-chloro-6-iodo - 2 - methoxyacridine, 9-chloro-3,6-dimethoxyacridine, 9-chloro-2,7-dimethoxyacridine, 6,9-dichloro - 2 - methoxyacridine, 7,9 - dichloro - 2 - methoxyacridine, 6,9 - dichloro-2-ethoxyacridine, and 6,9-dichloro-2,3-dimethoxyacridine. All of these reactants, and methods of preparing them, are described in the literature.

The aniline derivatives corresponding to the formula IV, above, which may be employed in making the new 9-anilinoacridine derivatives include, for example: o-biphenylamine, m-biphenylamine, xenylamine, 4' - methyl - o - biphenylamine, 3-chloro-o-biphenylamine, 5-bromo-m-biphenylamine, 3,5-dichloro-o-diphenylamine, 2-bromo-xenylamine, 2-phenoxyaniline, 4-phenoxyaniline, 4-(4-toloxy) aniline, 3-chloro-4-phenoxy-aniline, 2-bromo-4-phenoxyaniline, and 2-iodo-5-phenoxyaniline. Each of these amines, all of which are known in the art, may be made to react as described with any of the foregoing 9-chloroacridine derivatives to produce new compounds according to the invention.

The following examples will further illustrate the invention but are not to be construed as limiting its scope:

Example 1

A charge of 10.5 parts by weight of 6,9-dichloro-2-methoxyacridine and 6.8 parts of xenylamine, with 104 parts of phenol as solvent, was heated with agitation at 100° C. for 2 hours. The resulting dark red phenol solution was then stirred into 330 parts of 10 per cent aqueous sodium hydroxide, whereupon the free basic reaction product precipitated. This latter was washed with water until all alkali was removed, filtered off, dried, then heated for 4 hours in boiling alcohol, again filtered, washed with alcohol, and dried in air. There was obtained 12.5 parts of a dark yellow powder, having a melting point of about 189° to 190° C., and being probably 6-chloro-2-methoxy-9-xenylaminoacridine

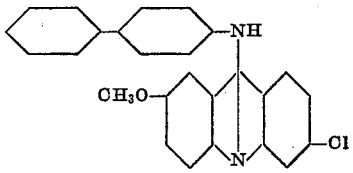

The compound was found, on analysis, to contain 8.78 per cent chlorine, a value close to 8.63 per cent theoretical for $C_{26}H_{19}ON_2Cl$. This compound shows activity against Diplococcus pneumoniae, type I.

Example 2

A charge of 10.5 parts by weight of 6,9-dichloro-2-methoxyacridine and 8.8 parts of 3-chloro-4-phenoxyaniline, dissolved in 52 parts of phenol, was heated at 75° C. with stirring until the solution turned dark red, and then further heated at 100° C. for 2 hours. The reaction product was then precipitated with alkali and worked up by the procedure of Example 1. There was obtained 16 parts of a yellow crystalline powder having a melting point of about 185° to 186.5° C., and being probably 6-chloro-9-(3-chloro-4-phenoxyanilino)-2-methoxyacridine.

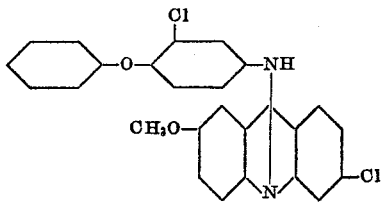

A chlorine analysis of the compound gave 15.44 per cent as compared to 15.38 per cent theory for $C_{26}H_{18}O_2N_2Cl_2$.

What is claimed is:

1. As new products, derivatives of 9-anilinoacridine corresponding to the general formula:

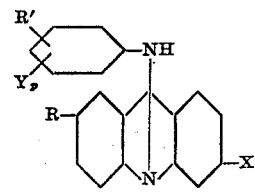

wherein R is lower alkoxy, R' is a radical of the group consisting of mononuclear aryl and aryloxy radicals, X and Y each is halogen, and $p$ is an integer from 0 to 2.

2. Compounds according to claim 1 wherein R is methoxy and X is chlorine.

3. As a new product, 6-chloro-2-methoxy-9-(xenylamino) acridine, a dark yellow powder having a melting point of about 189° to 190° C.

4. As a new product, 6-chloro-9-(3-chloro-4-phenoxyanilino)-2-methoxyacridine, a yellow crystalline powder having a melting point of about 185° to 186.5° C.

5. The method which comprises causing 6,9-dichloro-2-methoxyacridine to react with an aniline derivative corresponding to the general formula:

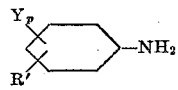

wherein R' is a radical of the group consisting of mononuclear aryl and aryloxy radicals, Y is halogen, and $p$ is an integer from 0 to 2.

6. The method of making 6-chloro-2-methoxy-9-(xenylamino) acridine which comprises causing 6,9-dichloro-2-methoxyacridine to react with xenylamine.

7. The method of making 6-chloro-9-(3-chloro-4-phenoxyanilino)-2-methoxyacridine which comprises causing 6,9-dichloro-2-methoxyacridine to react with 3-chloro-4-phenoxyaniline.

EDGAR C. BRITTON.
GERALD H. COLEMAN.

REFERENCES CITED

The following references are of record in the file of this patent:

UNITED STATES PATENTS

| Number | Name | Date |
| --- | --- | --- |
| 2,083,908 | Hata et al. | June 15, 1937 |
| 2,113,357 | Mietzsch et al. | Apr. 5, 1938 |